United States Patent [19]

Hardwick

[11] 3,707,993
[45] Jan. 2, 1973

[54] HEIGHT CONTROL VALVE
[75] Inventor: David R. Hardwick, St. Louis, Mo.
[73] Assignee: Wagner Electric Corporation
[22] Filed: March 15, 1971
[21] Appl. No.: 124,286

[52] U.S. Cl.................................137/636, 280/124
[51] Int. Cl.........................F16k 11/07, B60t 13/16
[58] Field of Search........137/596, 596.2, 627.5, 636; 280/124 F, DIG. 1; 267/65 D, 65 R

[56] References Cited

UNITED STATES PATENTS

| 2,967,547 | 1/1961 | Pribonic | 137/627.5 |
| 3,181,854 | 5/1965 | Backlund | 137/627.5 X |
| 2,976,053 | 3/1961 | Pribonic et al. | 137/627.5 X |
| 3,508,585 | 4/1970 | Kurichh | 137/627.5 |

Primary Examiner—Martin P. Schwadron
Assistant Examiner—David R. Matthews
Attorney—Joseph E. Papin

[57] ABSTRACT

A height control valve for use in a vehicle air suspension system is provided with an oscillatable member for actuating valve means to control the ingress and egress of fluid pressure in said system and also with a damping mechanism for providing a time delay in the operation of said valve means by said oscillatable member.

7 Claims, 5 Drawing Figures

PATENTED JAN 2 1973 3,707,993

INVENTOR:
DAVID R. HARDWICK
BY: Joseph E. Papin

HEIGHT CONTROL VALVE

This invention relates in general to height control valves for use in a vehicle fluid pressure suspension system and in particular to those height control valves which utilize damping mechanisms.

BACKGROUND OF THE INVENTION

In the past, vehicles have been provided with various fluid pressure suspension means, such as for instance air bags or the like, between the sprung and unsprung masses of the vehicle to substantially maintain a predetermined sprung mass height or roadway clearance regardless of the load impressed upon the vehicle sprung mass or the cornering effect of the vehicle. Of course, this was accomplished by providing a mechanical mechanism for determining a variance, i.e., an increase or decrease, in the height of the sprung mass from a predetermined norm or height relative to the unsprung mass, and upon such change, the mechanical mechanism was operable to actuate a height control valve to effect the ingress or egress of fluid pressure into or from the air bags as indicated in accordance with the height variance of the sprung mass due to changing load conditions thereon to return said sprung mass to the predetermined norm or height. In the past height control valves, it was, of course, necessary to provide a damping mechanism to obviate undesirable actuation of said past height control valve in response to road shocks on the vehicle which would cause many and varied changes of height of very short duration between the sprung and unsprung masses. The damping of the past height control valves was effected by reciprocally driving a damping piston, usually of a plastic composition or the like, in a cylinder filled with damping fluid; however, one of the undesirable or disadvantageous features of such past damping mechanisms was that the movement of the plastic damping piston was stopped or arrested by the engagement of the opposite ends thereof with abutments provided on the cylinder, and in many instances such arresting abutment caused deterioration or fracture of such plastic damping piston. Another undesirable or disadvantageous feature of such past damping mechanisms was the necessity of a relatively complex check valving arrangement in the damping piston to provide open damping fluid flow from a supply chamber therefor into one of the opposite ends of the cylinder while interrupting such damping fluid flow from the other of the opposite ends of said cylinder to said chamber upon the movement of said damping piston in said cylinder toward said other opposite end thereof.

SUMMARY OF THE INVENTION

The primary object of the present invention is to provide a height control valve for use in a vehicle fluid pressure suspension system which overcomes the aforementioned undesirable or disadvantageous features of the past height control valves, and this, as well as other objects and advantageous features of the present invention, will become apparent hereinafter.

Briefly, the present invention includes a height control valve for use in a vehicle fluid pressure suspension system having a valve means for controlling pressure fluid flow through said height control valve, damping means reciprocally movable in a cylinder in said height control valve, and oscillatable means for actuating said valve means and damping means, said oscillatable means being selectively engagable with said damping means to interrupt damping fluid communication between one of the opposite ends of said cylinder and a damping fluid supply chamber therefor upon movement of said damping means toward said one opposite end of said cylinder.

RELATED PATENTS

This patent application is related generally to the John F. Pribonic U.S. Pat. Nos. 2,967,549 issued Jan. 10, 1961 and 2,976,053 issued Mar. 21, 1961; however, this present patent application is a patentably distinct improvement.

DETAILED DESCRIPTION OF THE INVENTION

Figure 1:
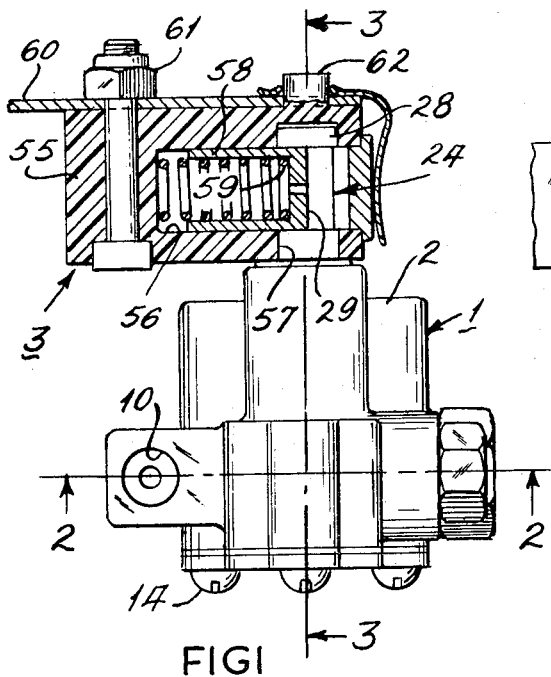
FIG. 1 is a plane view of the height control valve embodying the present invention.
Figure 2:
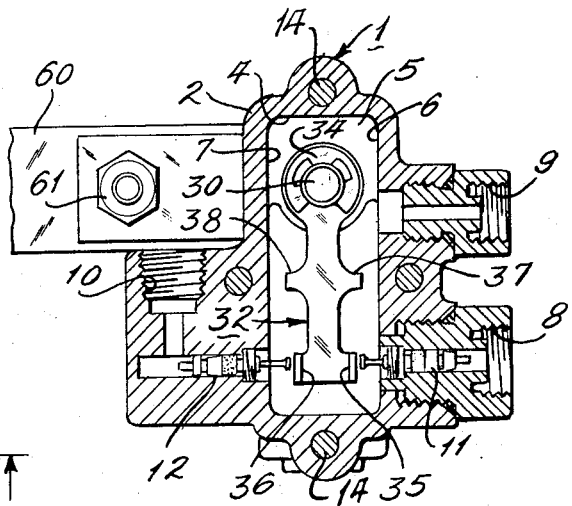
FIG. 2 is a sectional view taken along line 2—2 of FIG. 1.
Figure 3:
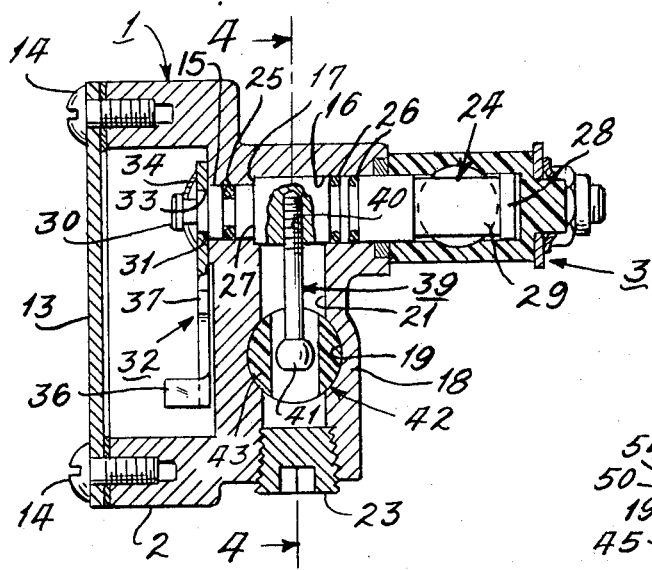
FIG. 3 is a sectional view taken along line 3—3 of the height control valve in FIG. 1.
Figure 4:
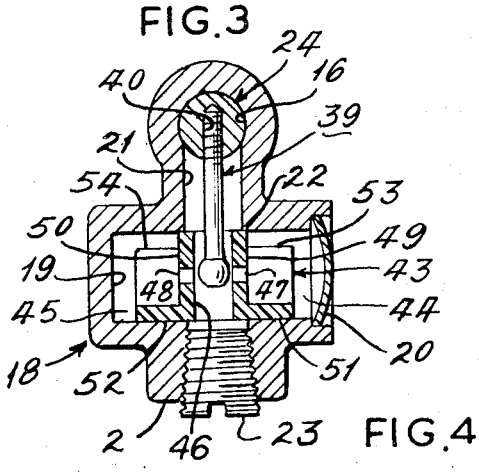
FIG. 4 is a sectional view taken along line 4—4 of the height control valve in FIG. 3.

Referring now to FIG. 1 a leveling or height control valve is provided with a housing 2 for connection with the vehicle body or sprung mass (not shown) and includes an overtravel mechanism indicated generally at 3, to be discussed hereinafter, for connection with the vehicle chassis or unsprung mass (not shown). The housing 2 is provided with a fluid pressure chamber 4, FIG. 2, having base wall 5 and opposed side walls 6, 7, and inlet, outlet and exhaust ports 8, 9, 10, which are adapted to be respectively connected with a vehicle fluid pressure supply, air springs (not shown), and the atmosphere, are provided in said housing intersecting with said chamber. Normally closed inlet and exhaust valves 11, 12 are provided in the inlet and exhaust ports 8, 10 of the housing 2 controlling the ingress and egress of fluid pressure to and from the chamber 4 and the outlet or delivery port 9, as described hereinafter. In FIG. 3, a closure member or plate 13 is sealably connected to the housing 2 by a suitable means such as screws 14, and a transversely extending bore and counterbore 15, 16 are provided in said housing intersecting with the chamber base wall 5, said bore and counterbore defining a thrust receiving shoulder 17 therebetween on said housing. Referring now also to FIG. 4, the housing 2 is provided with a cylinder portion 18 defined by a blind bore 19, having its open end closed by a closure member or welch plug 20. A cross-bore 21, which defines a damping fluid supply chamber for the cylinder 18, is also provided in housing 2 intersecting with the blind bore 19 adjacent to the mid-portion thereof to define a shoulder 22 in said housing, and the interior end of said cross-bore intersects with the transverse counterbore 16 while the lower or exterior end thereof is closed by a closure member or plug 23.

A stepped oscillatable or rockable member or shaft 24 carrying peripheral seals 25, 26 is rotatably received in the housing bore and counterbore 15, 16, and a shoulder 27 is provided on said shaft in thrust transmitting engagement with the housing shoulder 17. The shaft 24 is provided with an end portion 28 having a flat 29 thereon exteriorly of the housing 2 for operative engagement with the overtravel mechanism 3 while the interior end portion 30 of said shaft having opposed flats 31 thereon protrudes into the housing chamber 4.

A valve actuating member or arm 32 is provided with an aperture 33 in the upper end thereof which is received in mating or locking engagement with the shaft opposed flats 31 to insure concerted oscillation of said valve actuating arm with said shaft, and a snap or locking ring or washer 34 is received on the shaft interior end portion 30 in displacement preventing engagement with said valve actuating member urging it into thrust transmitting or bearing engagement with a portion of the base wall 5 of the chamber 4. Opposed tabs or valve operators 35, 36 are integrally provided on the lower end of the valve actuating arm 32 for operative engagement with the inlet and exhaust valves 11, 12, and opposed abutments or stops 37, 38 are integrally provided on said valve actuating member extending therefrom for abutting engagement with the sidewalls 6, 7 of the chamber 4 to limit the oscillation stroke or rotational movement of said valve actuating arm with the shaft 24.

Another actuating member or damping arm 39, which is oscillatable in the housing cross-bore 21, has its upper end threadedly received in a threaded bore 40 provided in the shaft 24 while the lower or driving end thereof extends into the blind bore 19 of the cylinder 18 defining a valve member 41 for driving and seating engagement with a damping mechanism or member, indicated generally at 42.

The damping member 42 includes a piston 43 slidable in the blind bore 19 and defining therewith opposed cylinder ends or chambers 44, 45, and a vertical slot 46 is provided through said piston in open pressure fluid communication with the damping fluid chamber 21. Opposed free flow passages 47, 48 are provided in the piston 43 communicating the cylinder ends 44, 45 with the piston slot 46, and valve seats 49, 50 are provided in said piston slot about said passages, respectively, for selective seating and driver engagement with the valve member 41 of the damping actuating arm 39 which is movably received in said slot between said passages. The clearance between the periphery of the damping piston 43 and the wall of the blind bore 19 provides restriction flow passages 51, 52 for the restricted flow of damping fluid between the cylinder ends 44, 45 and the piston slot 46 and supply chamber 21, and it should also be noted that the peripheral portion of said damping piston is provided with opposed recesses 53, 54 for selectively communicating said cylinder ends with said supply chamber, as discussed hereinafter.

As well known in the art, the viscosity of the damping fluid will change in accordance with temperature conditions, i.e., become less viscous at higher temperatures and more viscous at lower temperatures; therefore, to compensate for these viscosity changes in order to effect a substantially predictable flow rate of damping fluid through the restricted passages 51, 52 so as to make the delay factor of the movement of the damping piston 43 substantially constant, said damping piston is formed from a plastic material which has a rate of contraction and expansion greater than that of the metallic housing 2 relative to the lower and higher temperatures. In this manner, the damping piston 43 compensates for the temperature variance factor so that the damping actuation or effect thereof on the shaft 24 and valve actuating arm 32 will remain substantially constant regardless of the temperature to which the control valve 1 is subjected.

Referring now to FIG. 1, the overtravel mechanism 3 is provided with a body portion 55 having a bore 56 and intersecting cross-bore 57 therein, and the exterior end 28 of the oscillatable shaft 24 is rotatably received in the cross-bore 57. A piston 58 is slidable in the bore 56 and urged into abutting engagement with the flat 29 on the shaft exterior end 28 by the compressive force of a spring 59 interposed between said piston and the body 55. To complete the description of the height control valve 1, an actuating or motion transmitting link 60 has one end connected with the body portion 55 by suitable means such as the lock nut and stud assembly 61 and the body hub 62 protruding through said link while the other end thereof is connected with the vehicle unsprung mass.

OPERATION

When the link 60 of the overtravel mechanism 3 is rotated in a counter-clockwise direction, i.e., into the plane of the drawing of FIG. 1, in response to an increased load on the vehicle sprung mass which would, of course, decrease the predetermined height of the vehicle, the compressive force of the spring 59 acting on the piston 58 transmits such rotation or oscillation to the shaft 24 to effect the concerted rotation thereof. Of course, the valve actuating arm 32 and damping actuating arm 39 are concertedly rotatable with the shaft 24, and such shaft rotation rotates or moves said valve actuating arm from its normally centered or inoperative position, as shown on FIG. 2, to engage the tab 35 thereon with the inlet valve member 11 and thereafter move said inlet valve member to a position effecting the flow of fluid pressure from the inlet port 8 through the chamber 4 to the outlet port 9 to the vehicle air bags (not shown) connected therewith. This admission of the fluid pressure to the air bag thus restores the vehicle sprung mass to its predetermined height relative to the unsprung mass which causes the corresponding rotation of the link 60 in the clockwise direction along with the accompanying concerted clockwise rotation of the overtravel mechanism 3 and the shaft 24. Such clockwise rotation of the shaft 24 concertedly rotates the valve actuating arm 32 toward its centered position to initially effect the closure of the inlet check valve 11 and thereafter disengage the tab 35 from said inlet valve member so as to isolate the chamber 4 from the fluid pressure source. Of course, when the loading on the sprung mass is decreased to effect a rise of the sprung mass to a position in excess of the predetermined height, the link 60, the overtravel mechanism 3 and the shaft 24 are concertedly rotated in a clockwise direction to initially move the valve actuating arm from its centered position to engage the tab 36 thereof with the exhaust check valve 12 and thereafter open said exhaust check valve to permit the egress of fluid pressure from the vehicle air bags through the outlet port 9, the chamber 4, said exhaust check valve, and the exhaust port 10 the atmosphere. This exhaustion of fluid pressure from the vehicle air bags thus restores the sprung mass to its predetermined height relative to the unsprung mass which causes a corresponding rotation of the link 60, the overtravel mechanism 3 and the shaft 24 in the counter-clockwise direction. Upon this counter-clockwise rotation of the shaft 24, the valve actuating arm 32 is concertedly rotated toward its centered position to initially effect the closure of the exhaust check valve 12 and thereafter disengage the tab 36 from said exhaust check valve so as to isolate the chamber 4 from the atmosphere.

Of course, the maximum degree of movement of the arms 32, 39 is less than the maximum degree of movement of the link 60 of the overtravel mechanism 3 since the movement of the unsprung mass relative to the sprung mass due to bounce effected by rough road conditions must be accounted for or compensated; therefore, the overtravel mechanism 3 absorbs the difference in the degree of movement of the link 60 relative to that permissable for the arms 32, 39. However, it should be noted that opposed stops 37, 38 are provided on the arm 32 and movable therewith through a predetermined distance into engagement with the side walls 6, 7 of the chamber 4 to predeterminately arrest or limit the movement of said arm in the event the link 60 and overtravel mechanism are displaced to a degree in excess of that permissable for the arms 32, 39. Of course, the engagement of the stops 37, 38 with the chamber sidewalls 6, 7 to predeterminately limit the oscillation of the arms 32, 39 is effected to prevent destructive actuation of the inlet and exhaust check valves 11, 12 and to prevent the destruction of the damping piston 43, as discussed hereinafter.

The damping arm 39 is concertedly oscillated with the shaft 24 and valve actuating arm 32 in both the clockwise and counter-clockwise directions, as mentioned hereinbefore, in order to effect damping action and eliminate undesirable actuation of the inlet and exhaust valves 11, 12 in response to road roughness and vehicle vibrations. Upon the converted rotation of the damping arm 39 with the shaft 24 from the normal or centered position thereof, as shown in FIG. 4, in the leftward direction, the valve member 41 is initially engaged with the piston valve seat 50 to close the free flow passage 48 interrupting pressure fluid communication therethrough between the supply chamber 21 and the cylinder end 45, and thereafter further oscillation of the damping arm 39 drives the damping piston 43 leftwardly in the cylinder 18; however, upon such leftward movement of said damping piston to reduce or contract the volume of the cylinder end 45, it is apparent that the damping fluid in said cylinder end is displaced therefrom through the restricted passage 52 thereby resisting, impeding or damping the leftward movement of said damping piston from its centered position. Of course, as the leftward movement of the damping piston 43 reduces or contracts the cylinder end 45, the other cylinder end is being expanded, and compensating damping fluid flows from the supply chamber 21 through the open piston free flow passage 47 into the cylinder end 44; however, when the leftward movement of said damping piston is great enough, the piston recess 53 uncovers the housing shoulder 22 and places the cylinder end 44 in open compensating pressure fluid communication with said supply chamber through said recess. Of course, the maximum leftward movement of the damping piston 43 in the cylinder bore 19 is predeterminately limited by the engagement of the stop 37 on the valve actuating arm 32 in order to prevent the engagement of the opposed ends of said piston with the housing 2 and obviate damage to said damping piston which is formed from a plastic material or the like.

When the damping arm 39 begins its concerted clockwise movement with the shaft 24 back toward its centered position, the valve member 41 is disengaged from the valve seat 50 opening the free flow passage 48 to re-establish pressure fluid communication therethrough between the cylinder end 45 and the supply chamber 21, and said valve member is thereafter moved into sealing engagement with the valve seat 49 closing the free flow pressure 47 to interrupt pressure fluid communication therethrough between the cylinder end 44 and said supply chamber; however, it should be noted that said cylinder end 44 is in open pressure fluid communication with said supply chamber through the piston recess 53 which provides for a quick or substantially undamped return movement of said damping piston from its leftwardly displaced or translated position toward its centered position. Of course, the quick return movement of the piston 43 toward its centered position is arrested or damped when said piston covers the housing shoulder 22 to again interrupt damping pressure fluid communication between the cylinder end 44 and the supply chamber 21 through the piston recess 53, and further clockwise rotation of the shaft 24 and damping arm 3 to drive the damping piston 43 rightwardly in the cylinder bore 19 is opposed by the damping action of said piston. In this manner, damping fluid will be displaced from the cylinder end 44 only through the restricted passage 51 to the supply chamber 21 since the free flow passage 47 is closed by the valve 41 and the piston recess 53 is isolated from said supply chamber by the sliding engagement of said piston with the cylinder bore 19 when said piston is in its centered position.

Of course, the damped movement of the damping piston 43 rightwardly in the cylinder 18 from its centered position and the quick return movement to its centered position is the same as that previously described, and for the sake of expediency, the description thereof is omitted.

Figure 5:
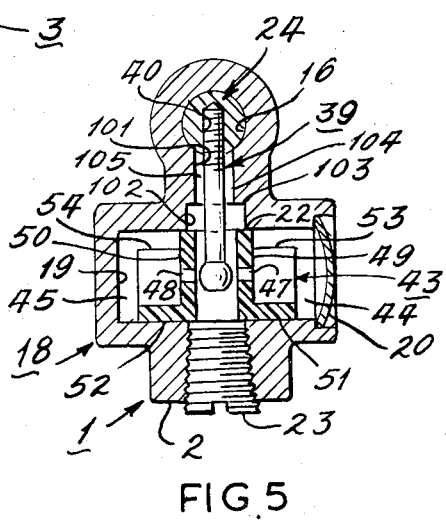
FIG. 5 is a sectional view substantially the same as FIG. 3 illustrating an alternative construction for arresting damping piston movement.

Referring now to FIG. 5, an alternative oscillation limiting construction is provided for the height control valve 1 in replacement of the stops 37, 38 of the valve actuating arm 32 and functioning substantially in the same manner thereof with the following exceptions. The alternative construction includes a stepped bore and counterbore 101, 102 in the housing 2 defining an annular shoulder 103 therebetween, said bore and counterbore defining the damping fluid supply chamber 21. The bore 101 intersects with the transverse counterbore 16, and the counterbore 102 intersects with the cylinder bore 19 adjacent to the mid-portion thereof defining the shoulder 22 on the housing 2, said counterbore 102 having its lower end closed by the plug 23. The diameter of the bore 101 is predetermined so that the diametrically opposed sidewall portions 104, 105 of said bore adjacent to the shoulder 103 define abutments or stops for engagement with the damping arm 39 to limit the concerted oscillation thereof with the shaft 24 and thereby obviate any destructive engagement of the damping piston end portions with the housing 2 upon the driven movement or reciprocation of the damping piston 43 in the cylinder 18, as previously described. In this manner, it is apparent that the reciprocation of the damping piston 43 is predeterminately limited by the engagement of the damping arm 39 with the housing stops 104, 105 or, alternatively, the engagement of the stops 38, 39 on the valve actuating arm 32 with the sidewalls 6, 7 of the housing chamber 5.

From the foregoing, it is now apparent that a novel height control valve 1 is disclosed and that changes or modifications as to the precise configurations, shapes and details of the construction set forth in the disclosure by way of illustration may be made by those skilled in the art without departing from the spirit of the invention.

The embodiments of the invention in which an exclusive property or privilege is claimed are defined as follows:

1. A height control valve for use in a vehicle fluid pressure suspension system comprising a housing, inlet and exhaust valve means in said housing controlling pressure fluid flow therethrough, a cylinder and damping fluid supply chamber therefor in said housing, unitary damping means freely reciprocally movable in said cylinder and defining therewith restricted passage means between each of the opposite ends of said cylinder and said chamber for the restrictive flow of damping fluid selectively therethrough upon the movement of said damping means, a pair of unrestricted passages in said damping means respectively connecting said cylinder opposite ends in open damping fluid communication with said chamber, a pair of opposed spaced valve seats on said damping means about said passages, respectively, and means oscillatable in said housing upon preselected conditions including means for respective engagement with said inlet and exhaust valve means to effect actuation thereof, and other means having other valve means disposed within said damping means and movable between said unrestricted passages for engagement with said valve seats, said other means being initially movable in response to the preselected oscillation of said oscillatable means to move said other valve means from a centered position between said valve seats toward one of opposed translated positions into engagement with one of said valve seats to selectively close one of said unrestricted passages interrupting the open damping fluid communication therethrough between one of said cylinder opposite ends and said chamber and being thereafter further movable with said other valve means engaged with said one valve seat to drive said damping means toward said cylinder one opposite end effecting restricted damping fluid flow through one of said restricted passage means while maintaining open damping fluid communication through the other of said unrestricted passages between the other of said cylinder opposite ends and said chamber.

2. A height control valve according to claim 1, wherein said included means includes a valve actuating member having one end connected with said oscillatable means and the other end thereof movable between said inlet and exhaust valve means for respective actuating engagement therewith upon the preselected oscillation of said oscillatable means.

3. A height control valve according to claim 2, wherein said other means includes an actuating member having one end connected with said oscillatable means, and said other valve means being integrally formed on said actuating member adjacent to the other end thereof.

4. A height control valve according to claim 1, comprising stop means on one of said included means and other means for engagement with said housing to predeterminately limit the reciprocal movement of said damping means.

5. A height control valve for use in a vehicle suspension system comprising a housing having a fluid pressure chamber and a damping fluid supply chamber therein, inlet and exhaust valve means in said housing controlling pressure fluid flow through said fluid pressure chamber, respectively, means oscillatable in said housing upon preselected conditions and extending between said chambers, first actuating means in said fluid pressure chamber connected for concerted movement with said oscillatable means and controlling said valve means, said actuating means being movable in response to the preselected oscillation of said oscillatable means to selectively engage and actuate one of said valve means, a cylinder in said housing connected with said supply chamber, a unitary damping piston freely reciprocally movable in said cylinder and defining therewith a pair of restricted passage means for the restrictive flow of damping fluid selectively between said cylinder opposite ends and said supply chamber, slot means in said damping piston connected with said supply chamber, a pair of unrestricted passages in said damping piston respectively connected in open damping fluid communication between said cylinder opposite ends and said slot means, a pair of spaced opposed valve seats on said damping piston within said slot means and about said unrestricted passages, respectively, second actuating means having one end in said supply chamber connected for concerted movement with said oscillatable means and the other end thereof disposed in said slot means, other valve means on said other end of said second actuating means and movable in said slot means from a normally centered position between said unrestricted passages toward opposed translated positions for respective engagement with said valve seats, said second actuating means being initially movable in response to the preselected oscillation of said oscillatable means to move said other valve means from its centered position toward one of its opposed translated positions into engagement with one of said valve seats to close one of said unrestricted passages interrupting the open damping fluid communication therethrough between one of said cylinder opposite ends and said supply chamber, and said second actuating means being thereafter further movable to drive said damping piston toward said one cylinder opposite end and effect restricted damping fluid flow through one of said restricted passage means between said one cylinder opposite end and said supply chamber to dampen the preselected oscillation of said oscillatable means while maintaining the open damping fluid communication between the other of said cylinder ends and said supply chamber through the other of the unrestricted passages.

6. A height control valve according to claim 1, wherein said damping piston includes opposed end portions defining with said housing the opposite ends of said cylinder, respectively, and opposed stop means on one of said first and second actuating means for engagement with said housing to predeterminately limit oscillation of said oscillatable means and the reciprocal movement of said damping piston in said cylinder to obviate engagement of said piston opposed end portions with said housing.

7. A height control valve for use in a vehicle suspension system comprising a fluid pressure chamber and a damping fluid chamber therein and including a common wall between said chambers, spaced inlet and exhaust valves in said housing for respectively controlling the ingress and egress of pressure fluid into and from said fluid pressure chamber, a shaft oscillatable in said housing upon preselected conditions and extending through said common wall between said fluid pressure and supply chambers, an arm in said fluid pressure chamber and connected for concerted oscillation with said shaft including a valve actuating portion movable between said inlet and exhaust valves for selective engagement therewith, said valve actuating portion being movable from a normally centered position between said spaced inlet and exhaust valves toward one of opposed translated positions in engagement with one of said inlet and exhaust valves to effect the actuation thereof upon the preselected oscillation of said shaft, a cylinder in said housing connected with said supply chamber, a unitary piston freely slidable in said cylinder and having opposed end portions defining with said cylinder a pair of opposed damping chambers, a pair of restricted damping passages between the periphery of said piston and said cylinder and connected between said damping chambers and said supply chamber, respectively, a slot in said piston between said opposed end portions thereof and connected with said supply chamber, a pair of opposed unrestricted passages in said piston respectively intersecting with said slot means and opposed end portions and normally connecting said damping chambers in open damping fluid communication with said supply chamber, a pair of spaced opposed valve seats on said piston within said slot and about said unrestricted passages, respectively, a damping arm in said supply chamber having one end connected for concerted oscillation with said oscillatable shaft and the other end thereof extending into said slot between said valve seats, another valve on said other end of said damping arm and movable in said slot from a normally centered position between said unrestricted passages toward opposed translated positions for respective engagement with said valve seats, said damping arm being initially movable in response to the preselected oscillation of said shaft to move said other valve from its normally centered position toward one of its opposed translated positions into sealing engagement with one of said valve seats to close one of said unrestricted passages interrupting the damping fluid communication therethrough between one of said damping chambers and said supply chamber, and said damping arm also being thereafter further movable when said other valve is engaged with said one valve seat to drive said piston toward said one damping chamber effecting restricted damping fluid flow therefrom through one of said restricted passages to said supply chamber damping the preselected oscillation of said shaft while maintaining the open damping fluid communication between the other of said damping chambers and said supply chamber through the other of said unrestricted passages.

* * * * *

UNITED STATES PATENT OFFICE
CERTIFICATE OF CORRECTION

Patent No. 3,707,993            Dated    January 2, 1973

Inventor(s) David R. Hardwick

It is certified that error appears in the above-identified patent and that said Letters Patent are hereby corrected as shown below:

Column 5, line 46, "converted" should read -- concerted --. Column 9, line 6, "1" should read -- 5 --.

Signed and sealed this 1st day of January 1974.

(SEAL)
Attest:

EDWARD M. FLETCHER, JR.        RENE D. TEGTMEYER
Attesting Officer               Acting Commissioner of Patents